A. J. MEYER.
VEHICLE WHEEL.
APPLICATION FILED MAY 3, 1910.

1,124,319.

Patented Jan. 12, 1915.

WITNESSES:
William S. Kies
Chauncey G. Austin, Jr.

INVENTOR.
August J. Meyer
BY Brown Williams
ATTORNEYS

UNITED STATES PATENT OFFICE.

AUGUST J. MEYER, OF CHICAGO, ILLINOIS, ASSIGNOR TO A. J. MEYER MOTOR CAR COMPANY, OF CEDARBURG, WISCONSIN, A CORPORATION OF WISCONSIN.

VEHICLE-WHEEL.

1,124,319.

Specification of Letters Patent.

Patented Jan. 12, 1915.

Application filed May 3, 1910. Serial No. 559,194.

*To all whom it may concern:*

Be it known that I, AUGUST J. MEYER, a citizen of the United States of America, and a resident of Chicago, in the county of Cook and State of Illinois, have invented certain new and useful Improvements in Vehicle-Wheels, of which the following is a specification.

My invention relates to improvements in resilient carrying and motive power for traction wheels and has for its object the provision of constructions of this character which shall be simple and effective with maximum resiliency at all times and under all conditions.

The most urgent demand for a wheel of this type at the present time is for a structure which shall best lend itself to the strenuous requirements of the motor vehicle, and my improvements have been directed particularly toward the solving of this problem, although it will be appreciated that my invention is in nowise limited to any specific application of the structure herein set forth.

I may briefly and generally describe the embodiment of my invention in a preliminary way by stating that there is a series of suitably inflatable cushions positioned circumferentially between the hub of my wheel and a suitable spoke-supporting spider, and diametrically between an alternate force-transmitting and force-resisting member, and have for their object the absorption of shock or jar and preventing the transmission of same to the occupants and vehicle itself.

To further augment the sphere of usefulness of my wheel, it is provided with a suitable positive positioning and rotative motion-transmitting member or members between the hub and a suitable spoke-supporting spider to make the same suitable for traction purposes.

Figure 1:
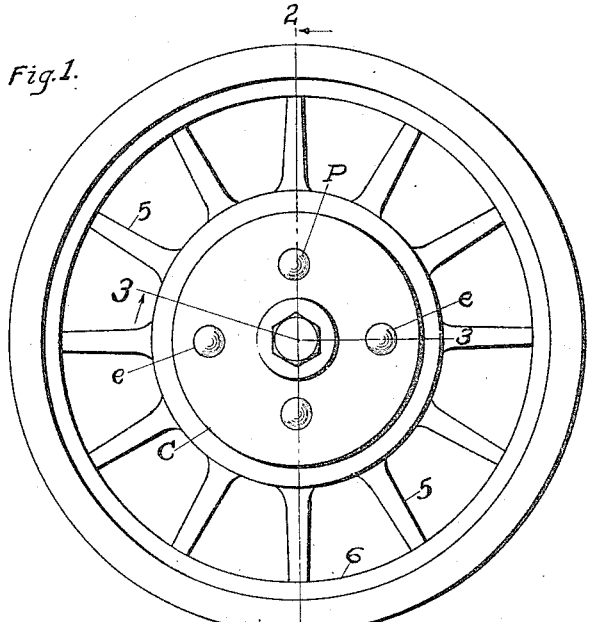
Figure 2:
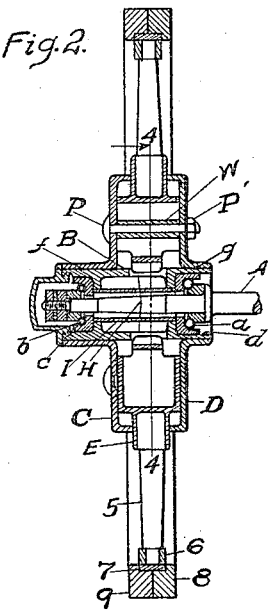
Figure 4:
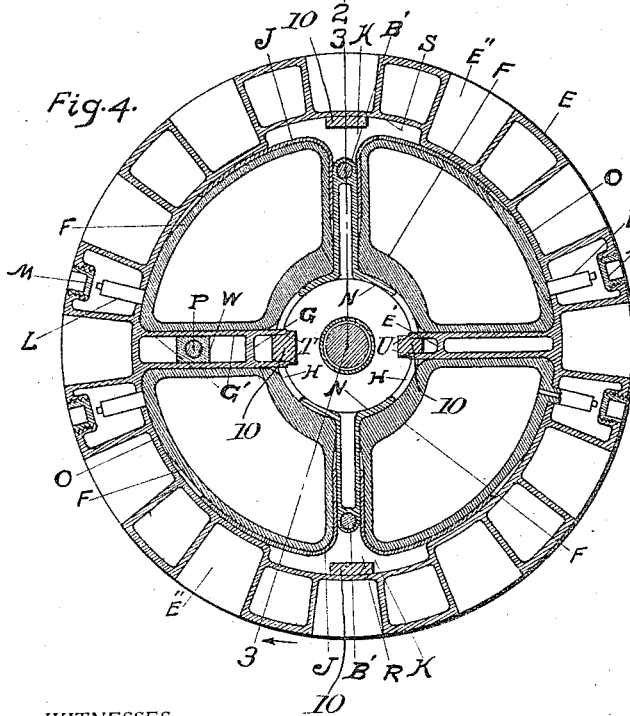
Figure 3:
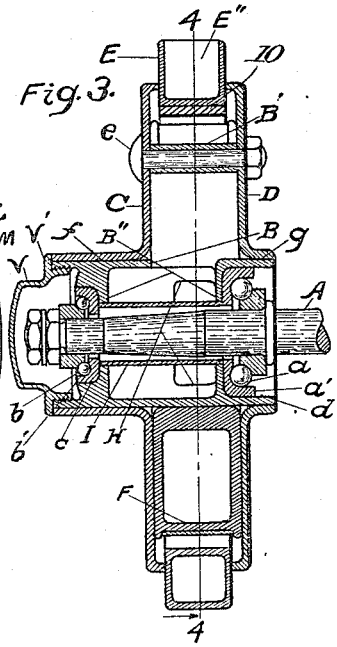

The details thereof will be explained in connection with the accompanying drawings wherein Figure 1 is a side elevation of the wheel embodying my invention; Fig. 2 is a central cross-section of my wheel taken in the plane indicated by the line 2, 2 of Fig. 1, and showing the axle, hub, ball bearings, lubricant tube, spoke-supporting spider with its inward extending arms and drive dog carrying swivel block, also spokes, rim, steel tire and sectional hard fiber or other suitable material wearing tire; Fig. 3 is an enlarged diametrical cross-section of the hub only on line 3, 3, Figs. 1 and 4, to facilitate the explanation and better illustrate the diametrical relation of the various parts of the hub to each other; Fig. 4 is an enlarged section in elevation of the hub, on line 4, 4, Figs. 2 and 3, to facilitate the explanation of the various important members of my invention.

Through each of the several figures of the drawings I have employed the same characters of reference to indicate similar parts.

Referring first to Fig. 1, it will be observed that in general appearance my wheel does not differ materially from those used on motor vehicles at the present time.

It will be appreciated that the resiliency of the present exposed pneumatic tire is transferred to an enlarged hub where the various operative members are entirely incased and protected from undue wear and exposure, and thus the life of the cushioning members materially prolonged. Likewise by the use of the large diameter hub flanges or disks which are securely attached to integral members of the hub toward their outer diameter, as hereinafter explained, the length and leverage of the spokes is materially reduced and a more compact and substantial wheel is produced as a result thereof. Also more graceful wheel action and a greater cushioning efficiency than the present exposed pneumatic tire yields is attained through the employment of a series of inflated cushions positioned between an alternate force-transmitting and force-resisting member or members, as hereinafter explained.

Referring to Fig. 2, it will be observed, considering the relation of the several parts in the position as shown and assuming axle A as fixed, it will be evident that if the tire composed of sections 8 and 9 should strike an obstruction it would cause spoke-supporting spider E to slide upward between disks or hub flanges C and D and compress lower inflated cushions F, Figs. 3 and 4, and allow the upper cushions to expand until the outer tire has passed the obstruction, when all cushions would assume normal position. Spokes 5 carry and are secured to wood rim or felly 6 at their outer ends and all are tightly held to spoke-supporting spider E by steel tire 7, to which also hard fiber or other suitable material wearing tire composed of sections 8 and 9 is securely fastened by suitable means.

Referring to Fig. 3, A is the axle carrying ball bearings $a$ and $b$, of which the cups $a'$ and $b'$ tightly fit chambers $c$ and $d$ of hub B. On the internal periphery of the internal hub flanges B'' is supported tube I through which lubricant passes between ball bearing $a$ and ball bearing $b$, and also prevents the lubricant from passing into other parts of the wheel hub. Hub B has a suitable number of integral outwardly extending arms B', two as shown, to which, by means of bolts, disk or hub flanges C and D are securely fastened and supported laterally and reinforced by tightly fitting hub B at $f$ and $g$ on the periphery. Hub cap V is threaded and engages the inside of the outer end of hub B to effectually inclose working parts at the outer end of the hub. By means of flange V' of hub cap V the disk C is supported and locked against hub arm B'.

Referring to Fig. 4, spoke-supporting spider E has a suitable number of inwardly extending arms (to alternate with those of the hub B) two as shown, E' and G. Inflatable cushions F are supported between hub arms B' and spoke-supporting spider arm G and spoke-supporting spider arm E' and hub arm B'. It will be observed that inflatable cushions F position and carry spoke-supporting spider E radially and concentric with a carrying hub B by expanding and pressing against outer peripheral wall N of hub B and reacting against inside diameter wall O of spoke-supporting spider E. In order to prevent inflatable cushions F from excessively expanding toward and into clearing space K, flexible steel reinforcement angular shoes J are so constructed and positioned that they can readily move radially along the side wall of hub arm B' and circumferentially along the inner wall O of spoke-supporting spider E. Individual inflation tubes L have been provided for each of the cushions F in the series, four as shown. By removing plug M which, it will be observed, is threaded with outer segmental wall of spoke-supporting spider E, an air pump may be connected to inflation tubes L and the cushions F may be inflated. If it should be found that under strenuous conditions there should be a metal to metal contact at R and S on inner wall O of spoke-supporting spider E and at T and U, the inside points of spoke-supporting spider arms E' and G, a rubber bumper 10 can readily be provided at these points to take up the jar or shock. It will be appreciated that a positive positioning and rotative motion-transmitting feature has been provided between hub B and spoke-supporting spider E in the event that hub B is to be keyed to axle A and thus make the wheel suitable for traction purposes. This is accomplished by securely fastening drive dog P, Figs. 1 and 2, into disk or hub flanges C and D and locking same in place by lock nut P', Fig. 2. To further improve this feature, drive dog P carries operatively swivel block W, which engages with and is free to travel radially between interior sides of wall G' of spoke-supporting spider arm G. And since swivel block W is free to oscillate on drive dog P, spoke-supporting spider E is free to move in any direction that the supporting and actuating members with which it is associated or connected may force it to, due to the undulating surface of the highways.

An opening is provided on the cylindrical peripheral wall N of hub B at H to permit ends T and U of spoke-supporting spider arm E' and G to move to any position necessary without interference.

Sockets E'' of spoke-supporting spider E have been provided to receive the butt end of spokes 5, Figs. 1 and 2.

The spokes have been omitted in Figs. 3 and 4 to simplify the drawings. It will be appreciated that on account of a series of inflatable cushions F positioned between an alternate arm of hub B and spoke-supporting spider E and enabling cushions F to act independently of each other in case one cushion of the series should give out, it will not affect the efficiency of the others individually or collectively and thus eliminate the disagreeable task of removing and replacing pneumatic tubes or tires along the wayside.

Having now described a wheel embodying my invention, I claim as new, together with such modifications as may be made by those skilled in the art, the following:

1. In a cushion wheel, the combination of a hub, a spoke-supporting spider surrounding the hub, inwardly extending arms on the spider, outwardly extending arms on the hub between the spider arms, pneumatic cushions between the hub and spider located between such arms, and metallic shoes supporting the cushions adjacent to the paths of such arms.

2. In a cushion wheel, the combination of a hub, a spoke-supporting spider surrounding the hub, resilient cushions between the hub and spider, and sliding metal shoes for protecting the ends of the cushions.

3. In a cushion wheel, the combination of a hub having outwardly extending parallel flanges, a spoke-supporting spider located between the flanges and provided with an inwardly extending arm, resilient devices between the spider and the hub, a single driving rod extending through both flanges and the arm, and a sliding block carried by the arm to engage the rod.

4. In a cushion wheel, the combination of a hub, a spider surrounding the hub, inwardly extending arms on the spider, outwardly extending arms on the hub between the spider arms, resilient cushions between the hub and spider located between such arms, and protecting shoes supporting the cushions adjacent to the paths of such arms.

5. In a cushion wheel, the combination of a hub, a spider surrounding the hub, inwardly extending arms on the spider, outwardly extending arms on the hub between the spider arms, resilient cushions between the hub and spider located between such arms, and flexible sliding shoes supporting the cushions adjacent to the paths of such arms.

6. In a cushion wheel, the combination of a hub having outwardly extending flanges, a spider surrounding the hub and adapted for supporting the spokes of the wheel, outwardly extending arms on said hub, there being openings between said arms and the spider, inwardly extending arms on the spider, a plurality of resilient cushioning devices between said hub and spider arms, and flexible protecting shoes engaging said hub arms and said spider and projecting across said openings.

7. In a cushion wheel, the combination of a hub having outwardly extending flanges, a spider surrounding the hub and adapted for supporting the spokes of the wheel, outwardly extending arms on said hub, there being openings between said arms and the spider, inwardly extending arms on the spider, a plurality of resilient cushioning devices between said hub and spider arms, and protecting sliding shoes engaging said hub arms and said spider, said shoes serving to prevent the cushioning devices from entering said openings.

8. In a cushion wheel, the combination of a hub, a spider surrounding the hub, inwardly-extending arms on the spider, outwardly-extending arms on the hub between the spider arms, resilient cushions between the hub and spider located between such arms, resilient bumpers in the path of said arms for limiting their motion, and protecting shoes supporting the cushions adjacent to the paths of such arms.

9. In a cushion wheel, the combination of a hub, a spider surrounding the hub, inwardly-extending arms on the spider, outwardly-extending arms on the hub between the spider arms, resilient cushions between the hub and spider located between such arms, resilient bumpers for limiting the motion of the hub relatively to the spider, and flexible sliding shoes supporting the cushions adjacent to the paths of such arms.

In witness whereof, I hereunto subscribe my name this 28th day of April A. D. 1910.

AUGUST J. MEYER.

Witnesses:
 ALBERT C. BELL,
 ROBERT F. BRACKE.

Copies of this patent may be obtained for five cents each, by addressing the "Commissioner of Patents, Washington, D. C."